Patented Apr. 15, 1941

2,238,242

UNITED STATES PATENT OFFICE 2,238,242

AROMATIC FLUORINE COMPOUNDS

Walter J. Balon, Carneys Point, and John M. Tinker, Penns Grove, N. J., assignors to E. I. du Pont de Nemours & Company, Wilmington, Del., a corporation of Delaware No Drawing. Application June 24, 1939, Serial No. 280,908

8 Claims. (Cl. 260—649)

This invention relates to the manufacture of new organic fluorine compounds and more particularly to organic fluorine compounds having the general formula:

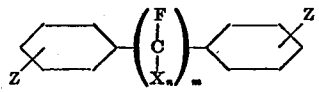

in which

X is a halogen atom;
$n=0$ or 1;
$m=1$ or 2, when $n$ is 1;
$m=2$ when $n$ is 0; and
Z is hydrogen or alkyl.

This invention has as an object the preparation of new aromatic fluorine compounds. A further object is to manufacture these compounds by novel and easily conducted processes which give high yields of high quality products. A still further object is to use these new compounds as starting materials in the preparation of various useful derivatives thereof. Other objects will appear hereinafter.

The objects of this invention are accomplished by replacing the halogen atoms of a halogenated diaryl alkane or alkene, such as diphenyl dichloromethane, diphenyl tetrachloro-ethane, etc., with fluorine by means of anhydrous hydrogen fluoride or certain of its metallic salts, such as antimony trifluoride, mercuric fluoride, etc., in the presence or absence of a fluorination catalyst. The fluorination occurs very smoothly and organic products are obtained containing fluorine. It has been found that unsaturated organic fluorine compounds of the type: R—CF=CF—R, wherein R stands for an aryl group, may be obtained when saturated compounds of the type: R—CCl₂—CCl₂—R, wherein R stands for an aryl group, are heated with anhydrous hydrogen fluoride.

This invention will be understood more completely by reference to the following examples. All parts are by weight.

Example 1

490 parts of crude diphenyl dichloro-methane and 3 parts of pentavalent antimony fluoro-chloride (see U. S. Patents 1,934,943 and 1,984,480 for the preparation of this fluorination catalyst) were placed in a closed copper vessel which was equipped with a copper reflux condenser to permit escape of hydrogen chloride evolved. The mixture of diphenyl dichloro-methane and pentavalent antimony fluoro-chloride was rapidly agitated at 30–40° C. and gaseous anhydrous hydrogen fluoride was passed in through a copper inlet tubing below the surface of the mixture until no more hydrogen chloride was given off. After 20 to 25 hours, the reaction was completed. The crude fluorinated product containing a small amount of condensed hydrogen fluoride was carefully drowned in ice water, and the lower oily layer was then separated, washed free from acid with dilute aqueous ammonia or with 10% aqueous sodium carbonate solution. The crude oily product was then extracted with benzene, and the benzene extract dried over sodium hydroxide. The benzene was then removed by distillation at atmospheric pressure, and the residue on vacuum distillation gave diphenyl difluoromethane as a colorless liquid, boiling at 105–106° C. at 5 mm. in a yield of 75% to 80%.

Diphenyl difluoro-methane boils at atmospheric pressure at about 258° C. with slight decomposition. The diphenyl difluoro-methane is a colorless liquid, having a pleasant odor and specific gravity of 1.1545 at 25° C. and a refractive index of $$N\frac{33°\ C.}{D}1.539$$

Example 2

25 parts of tolane tetrachloride (diphenyl tetrachloro-ethane) prepared according to the method of Eiloart (Amer. Chem. Jour. 12, 231) were mixed with 90 parts of technically anhydrous hydrogen fluoride in an iron pressure vessel. The vessel was slowly heated on a water bath in two hours to 100° C. and held at this temperature for a period of three hours. It was then cooled to 10–15° C., and the hydrogen chloride evolved from the reaction was allowed to escape through a valve. The product was then removed from the vessel and drowned in ice water, washed acid free with dilute aqueous ammonia and then with water, filtered, and dried at 50° C. in an air oven. The crude product was finely powdered and extracted under a reflux condenser with 250 parts of ethyl alcohol for a period of 1½ hours. The alcoholic extract was decolorized with activated charcoal and filtered hot. The alcoholic filtrate was diluted with 100 parts of water to partly precipitate the product, then heated to boil until a clear solution resulted, and then allowed to cool slowly to crystallize the product. In this manner diphenyl difluoro-ethene was obtained in the form of colorless needles having a melting range of 122–123° C. in a yield of 70% of theory. Diphenyl difluoro-ethene is insoluble in water, very soluble in petroleum ether, benzene and acetone, and moderately soluble in alcohol.

*Example 3*

75 parts of tolane tetrachloride and 107 parts of red mercuric oxide were placed in a closed copper vessel equipped with a copper condenser and an agitator. The mixture was agitated at a temperature of 50-60° C., and gaseous anhydrous hydrogen fluoride passed in through a copper inlet tubing below the surface of the mixture for a period of 5 to 6 hours, or until the red color of the mercuric oxide disappeared. The reaction was complete when the mercury compound present became white or slightly gray. Then the copper vessel and contents were gradually warmed to 70° C. to drive off any condensed hydrogen fluoride. The solid slightly grayish mass was drowned in 500 parts of ice water and filtered. The insoluble material was washed by grinding with water in a mortar and decanting until the washings were no longer acid to Congo Red paper. It was then filtered and dried at 50° C. in an air drier for 12 hours. The dried product was then extracted with 1000 parts of petroleum ether. After evaporation of the petroleum ether, diphenyl difluoro-dichloro-ethane was obtained in the form of pale yellow crystals having a melting range of 128-130° C.

This invention comprehends the preparation of other fluorinated organic compounds coming within the scope of the general formula given above. We may start with other halogenated diphenyl ethane derivatives containing the halogen atoms, chlorine, bromine or iodine, such as diphenyl tetrabromo-ethane, diphenyl dichloro-dibromo-ethane, etc., or we may start with halogenated diphenyl ethene derivatives containing the halogen atoms, chlorine, bromine or iodine, such as diphenyl dichloro-ethene, diphenyl dibromo-ethene, diphenyl chloro-bromo-ethene, etc. One or both of the aryl groups of the diphenyl halogenated ethane or ethene derivatives may contain alkyl substituents, such as methyl, ethyl, etc. One or more of the halogen atoms may be replaced by fluorine atoms.

We may prepare diphenyl difluoro-methane by starting with diphenyl dibromo-methane or diphenyl chloro-bromo-methane. One or both of the aryl groups of the diphenyl halogenated methane may contain an alkyl substituent group, such as methyl, ethyl, etc. One or both of the halogen atoms may be replaced by fluorine atoms.

In place of anhydrous hydrogen fluoride as the fluorination agent, its metallic salts, such as antimony trifluoride, mercuric fluoride, etc., may be used.

The new fluorine compounds disclosed herein are useful as starting materials in the preparation of various chemical products, such as dyestuffs, fungicides, insecticides and pharmaceuticals.

The present invention includes as one of its embodiments a new method of preparing unsaturated organic compounds containing fluorine, by heating saturated halogenated organic compounds with anhydrous hydrogen fluoride.

Resort may be had to such modifications and equivalents as fall within the spirit and scope of the appended claims.

We claim:

1. Organic fluorine compounds having the general formula

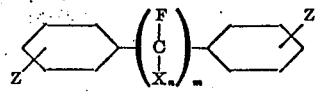

wherein X represents a halogen atom; $n$ stands for one of the numerical values 0 and 1, $m$ denotes a numerical value of 2 when $n$ is 0 and one of the numerical values 1 and 2 when $n$ is 1, and Z represents a member of the class consisting of hydrogen and alkyl groups.

2. Organic fluorine compounds having the general formula

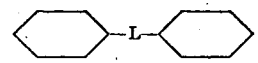

wherein L represents a linkage selected from the class consisting of

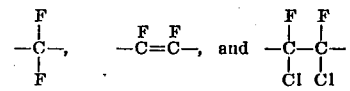

3. Diphenyl difluoro-methane.

4. A process of making diphenyl difluoro-methane which comprises passing anhydrous gaseous hydrogen fluoride into diphenyl dichloro-methane until hydrogen chloride is no longer evolved.

5. Symmetrical diphenyl difluoro-ethene.

6. A process of making symmetrical diphenyl difluoro-ethene which comprises heating symmetrical diphenyl tetrachloro-ethane with anhydrous hydrogen fluoride.

7. Symmetrical diphenyl difluoro-dichloro-ethane.

8. A process of making symmetrical diphenyl difluoro-dichloro-ethane which comprises passing anhydrous gaseous hydrogen fluoride into a mixture containing 75 parts of symmetrical diphenyl tetrachloro-ethane and 107 parts of red mercuric oxide until the red color of the mercuric oxide disappears.

WALTER J. BALON.
JOHN M. TINKER.

DISCLAIMER 2,238,242.—*Walter J. Balon*, Carneys Point, and *John M. Tinker*, Penns Grove, N. J. AROMATIC FLUORINE COMPOUNDS. Patent dated April 15, 1941. Disclaimer filed February 25, 1942, by the inventors and the assignee, *E. I. du Pont de Nemours & Company, Inc.*

Hereby enter this disclaimer to claim 8 in said patent.

[*Official Gazette April 7, 1942.*]